Patented Nov. 29, 1949

2,489,451

UNITED STATES PATENT OFFICE 2,489,451

HYDROCARBON SYNTHESIS PROCESS

Jack Calhoun Dart and Lloyd B. Smith, Baton Rouge, La., assignors to Standard Oil Development Company, a corporation of Delaware No Drawing. Application June 20, 1946, Serial No. 678,168

8 Claims. (Cl. 260—449.6)

The present invention relates to an improved hydrocarbon synthesis process. It is more particularly concerned with a hydrocarbon synthesis reaction wherein operating conditions especially pressures are closely controlled so that high yields of desired products are secured with a minimum deterioration of the catalyst. In accordance with the present invention, hydrocarbon synthesis reactions are carried out at critical elevated pressures, employing two pressure stages, to secure high yields and high selectivities with a minimum deterioration of the catalyst.

It is well known in the art to conduct hydrocarbon synthesis reactions by contacting hydrogen and oxides of carbon with catalysts under various temperature and pressure conditions. The catalysts employed are usually selected from the iron group metals, as, for example, iron, cobalt, and nickel. They are utilized either alone or on suitable carriers such as kieselguhr, diatomaceous earth, pumice, synthetic gels, silica, and alumina. Promoters, such as oxides of chromium, zinc, aluminum, magnesium, and the rare earth metals, are used with the iron group metals. These catalysts are employed either in fixed bed or fluid catalyst operations.

The temperatures employed vary widely as, for example, in the range from about 300° F. to 800° F. and are generally in the range from about 350° F. to 700° F. The particular temperature employed will depend upon, among other factors, the type of non-gaseous hydrocarbon product desired, the character and activity of the particular catalyst utilized, the throughput and composition of the synthesis gases and upon the reaction pressure. For instance, when utilizing a mixture of feed gases comprising carbon monoxide and hydrogen in the ratio of 1 mol of carbon monoxide per two mols of hydrogen at pressures in the range from atmospheric to 100 pounds per square inch and in the presence of a fresh cobalt catalyst, the reaction temperature is generally in the range from about 340° F. to about 500° F. On the other hand, if similar feed gases are utilized employing 300 pounds per square inch pressure and an iron catalyst, the temperature is usually in the range from about 500° F. to about 750° F.

The pressures likewise vary considerably and are a function of other operating conditions such as catalyst employed, activity of the catalyst, character of the feed gases and the temperatures utilized. Pressures in the range from about 1 to 100 atmospheres have been suggested. When utilizing iron type catalyst, it has been proposed to use elevated pressures although preferred pressures had been in the range below about 300 pounds per square inch gauge. When employing a cobalt catalyst, the pressures generally employed have been somewhat lower, generally around atmospheric pressure and seldom in excess of 100 pounds per square inch gauge.

The character of the feed gases depends somewhat upon the temperatures and pressures and upon the catalyst employed. For example, when employing an iron type catalyst, it is generally preferred to use one or two mols of carbon monoxide per two mols of hydrogen while when a cobalt catalyst is utilized, two mols of hydrogen per mol of carbon monoxide in the feed synthesis gases are desirable.

From the preceding discussion and description, it is apparent that wide operating conditions with respect to temperatures and pressures have been suggested. However, we have now discovered that providing particular critical pressure ranges are employed in two stages, while operating under other predetermined fixed conditions, unexpected desirable results are obtained.

In accordance with our invention, we employ pressures in an initial stage below about 350 pounds per square inch. Preferred pressures in the initial stage are in the range from about 200 to 300 pounds per square inch. When operating under these conditions, carbon builds up upon the catalyst. We have discovered that as the carbon formation builds up upon the catalyst, the selectivity of the catalyst increases. However, after the carbon formation has reached a critical maximum limit, it is not possible to maintain the catalyst in a fluid state. Furthermore, as the carbon formation builds up upon the catalyst a critical maximum limit is reached and deterioration of the catalyst results.

We have discovered that it is desirable to maintain carbon on the catalyst in the range from about 30 to 55% carbon by weight, based upon the weight of the catalyst. In accordance with our invention after the initial stage has been run at a pressure below about 350 pounds per square inch for a time sufficient to produce on the catalyst a carbon formation in the range from about 30 to 55%, based upon the weight of the carbon-free catalyst, the pressure is raised in a second stage above about 350 pounds per square inch.

The pressures we employ in the secondary stage of our process are above 350 pounds per square inch, preferably above 400 pounds per square inch to 800 pounds per square inch and higher. If these pressures are employed in the secondary stage in conjunction with other operating conditions, high yields of liquid product are secured with a minimum loss of the activity of the catalyst, due to excessive carbon formation.

It has heretofore been known that synthesis reactions could be carried out without losing substantial activity of the catalyst and without securing any substantial carbon formation on the catalyst. However, when conducting operations of this character, the selectivity of the catalyst for propane and higher boiling constituents was relatively low as well as the yields. On the other hand, if operating conditions were adjusted to secure high yields and high selectivities, undesirable carbon formation would occur, followed by deterioration of the catalyst. Much time and effort have been spent attempting to solve this particular problem, that is, how to secure high selectivities and high yields without incurring excessive carbon formation and subsequent decomposition of the catalyst.

In accordance with our process, we operate using two distinct elevated pressures stages. In the initial stage, operating conditions are adjusted to secure high yields and a high selectivity while the pressure is maintained below 350 pounds per square inch, preferably in the range from about 200 to 300 pounds per square inch. Under these conditions carbon will build up on the catalyst and its selectivity will be improved. In accordance with our invention, these conditions are maintained in the initial stage until the carbon formation on the catalyst builds up to a point at which it is difficult to fluidize the catalyst. In general, the initial stage is continued until the carbon formation on the catalyst is in the range from about 30 to 55% carbon by weight, based upon the total weight of the carbon-free catalyst. In the secondary stage operating conditions are maintained to secure high yields and high selectivities and concurrently prevent deterioration of the catalyst by excessive carbon formation, by maintaining the pressure in the reaction zone above 350 pounds per square inch, preferably in the range from about 400 to 800 pounds per square inch and higher.

Operating conditions are controlled in the secondary stage to give minimum yields of 190 cc. of butane and higher boiling constituents, or minimum yields of 250 cc. of propane and higher boiling constituents per cubic meter of carbon monoxide and hydrogen consumed. Preferred operating conditions are maintained to give a minimum yield of at least 200 cc. of butane and higher boiling constituents per cubic meter of carbon monoxide and hydrogen consumed.

In employing our critical pressures in conjunction with other operating conditions designed to produce the high yields and selectivities specified, it is to be understood that these latter conditions are interrelated and that their actual value is a function of one another. However, in general, we employ our critical elevated pressures, and control within specified ranges the character and composition of the feed gases, the temperature of the reaction and the volumes of feed gases per hour per pound of catalyst.

If yields and selectivities of at least 190 cc. of butane and higher boiling constituents are to be secured in the secondary stage, it is essential that the temperature of the reaction be above about 575° F., preferably in the range from about 650° F. to 725° F. It is also desirable that the volume of feed gas per hour per pound of catalyst be above 25, preferably in the range from about 75 to 200 and above.

The catalyst employed may be any suitable Fischer synthesis catalyst comprising iron, cobalt, or nickel. The catalyst may also comprise any iron base catalyst such as a synthetic ammonia catalyst and the like. The composition of the fresh feed gases to the reaction zone is preferably about one mol of carbon monoxide per mol of hydrogen when employing an iron type catalyst and one mol of carbon monoxide per two mols of hydrogen when utilizing a cobalt catalyst.

However, when employing an iron type of a synthetic ammonia catalyst (a high purity magnetite fused and promoted with an alkali material such as potassium carbonate and alumina), it is preferred to use one mol of carbon monoxide per two mols of hydrogen.

The process of our invention may be readily understood by the following examples given for the purpose of illustrating the same.

*Example*

A number of operations were conducted using an iron type of synthetic ammonia catalyst.

The composition of the fresh feed gases to the system and the composition of the total feed gases to the reaction zone due to recycle average as follows:

|  | Fresh Feed | To Reaction Zone |
|---|---|---|
| Hydrogen | 59.9 | 39.4 |
| Carbon Monoxide | 29.1 | 14.1 |
| Carbon Dioxide | 7.9 | 26.2 |
| Nitrogen | 1.2 | 1.5 |
| Unsaturates |  | 3.0 |
| Total Paraffins | 1.9 | 15.8 |

Five runs were made in the initial stage using pressures in the range from 232 pounds per square inch to 240 pounds per square inch. A summary of data on these initial runs in the initial stage is given in the following table.

| Run | Percent Carbon on Catalyst | Yield of Butane [1] and Higher Boiling Constituents |
|---|---|---|
| 1 | 18.3 | 179 |
| 2 | 20 | 180 |
| 3 | 28 | 205 |
| 4 | 32 | 216 |
| 5 | 36 | 196 |

[1] Cc.'s of butane and higher boiling constituents produced per cubic meter of hydrogen and carbon monoxide consumed.

The details of the five runs in the initial stage are given in the following table:

| Run | 1 | 2 | 3 | 4 | 5 |
|---|---|---|---|---|---|
| Feed Composition, Mol. Percent: | | | | | |
| H₂ | 59.7 | 58.4 | 59.6 | 61.3 | 60.8 |
| CO | 27.9 | 30.2 | 29.4 | 28.1 | 28.5 |
| CO₂ | 7.4 | 6.5 | 7.0 | 8.1 | 8.2 |
| CH₄ | 1.0 | 1.6 | 1.3 | 1.1 | 1.1 |
| N₂ | 3.5 | 3.1 | 2.4 | 1.4 | 1.4 |
| Gas Rates, SCFH: | | | | | |
| Synthesis Gas | 7,000 | 7,280 | 7,335 | 7,550 | 7,280 |
| Exit Gas | 1,740 | 2,040 | 2,150 | 1,990 | 1,560 |
| Bleed Gas | 675 | 565 | 520 | 505 | 465 |
| Recycle Gas | 13,500 | 14,200 | 14,500 | 14,660 | 13,050 |
| Blowback Gas | 3,410 | 3,250 | 2,550 | 2,220 | 1,670 |
| Recycle Ratio | 1.9 | 2.0 | 2.0 | 1.9 | 1.8 |
| Aver. Catalyst Temperature, °F | 637 | 646 | 648 | 666 | 667 |
| Reactor Outlet Pressure, p. s. i. g | 240 | 235 | 235 | 238 | 232 |
| Sup. Vel., Ft./Sec. at Inlet | 1.3 | 1.4 | 1.4 | 1.4 | 1.3 |
| V./Hr./W.[1] | 24.5 | 37.6 | 40.7 | 39.7 | 36.8 |
| Total Feed Composition, Mol. Percent: | | | | | |
| H₂ | 48.0 | 46.2 | 45.0 | 42.0 | 39.8 |
| CO | 14.2 | 15.6 | 15.6 | 14.1 | 13.0 |
| CO₂ | 21.8 | 22.1 | 21.6 | 23.8 | 24.0 |
| Liq. Yields, cc./m.³ H₂+CO Cons.: | | | | | |
| C₄+ | 179 | 180 | 205 | 216 | 196 |
| C₃+ | 223 | 214 | 245 | 250 | 234 |

[1] Volumes of feed gases (measured in cubic feet at standard conditions) per hour per pound of carbon-free catalyst.

From the foregoing data it is apparent that the selectivity of the catalyst increased appreciably as the carbon content on the catalyst built up. For example, the yields of butane and higher boiling constituents between operation 1 and operation 4 increased from 179 to 216 cc. per cubic meter of carbon monoxide and hydrogen consumed. It is also apparent that a critical maximum was reached with respect to the amount of carbon on the catalyst which was about 32%.

The second stage of the operation was then conducted and nine runs made. The results of the various runs are summarized in the following table:

| Operation | 1 | 2 | 3 | 4 | 5 | 6 | 7 |
|---|---|---|---|---|---|---|---|
| Butane [1] | 207 | 220 | 197 | 220 | 214 | 226 | 219 |
| Propane [1] | 243 | 261 | 237 | 260 | 256 | 262 | 258 |
| Pressure, lbs./sq. in | 394 | 404 | 401 | 400 | 400 | 404 | 399 |
| Temp., °F | 659 | 675 | 676 | 673 | 676 | 664 | 670 |
| V/Hr./W [2] | 77.1 | 98.8 | 94.3 | 94.7 | 95.9 | 92.9 | 93.7 |
| Carbon Inc. Cat. Deter. | No | No | No | No | No | No | No |

[1] Butane and higher boiling constituents produced, propane and higher boiling constituents produced per cubic meter of hydrogen and carbon monoxide consumed.
[2] V./hr./W. is volumes of gas measured in cubic feet at standard conditions per pound of carbon-free catalyst per hour.

Our invention generally comprises conducting a Fischer synthesis reaction in two stages under conditions to secure high yields and high selectivities. In the initial stage, elevated pressures in the range below about 350 pounds per square inch are employed, while in the second stage, the pressures are in the range preferably above 400 pounds per square inch. The first stage is conducted for a time period under which the carbon content of the catalyst is increased to a content in the range from about 30 to 55%. Pressures are increased in the second stage to prevent any further increase in the carbon formation on the catalyst. Operation may be carried out in any conventional apparatus such as described and illustrated in U. S. Patent 2,383,636 to W. A. Wurth.

The process of our invention is not to be limited by any theory as to mode of operation but only in and by the following claims, in which it is desired to claim all novelty insofar as the prior art permits.

We claim:
1. A method for synthesizing hydrocarbons by the interaction of carbon monoxide and hydrogen which comprises initially contacting carbon monoxide and hydrogen with a finely divided highly active iron type synthesis catalyst maintained in a fluidized state at a pressure substantially above atmospheric but below 350 lbs. and under conditions under which particles of said finely divided catalyst become associated with carbon, continuing the operation for a period sufficient to modify the composition of said catalyst by the inclusion therein of an amount of carbon between 30 and 55% by weight of said catalyst, and thereafter contacting fresh reactant gases with the catalyst of altered composition at a pressure in excess of 350 p. s. i. g. and at a temperature from about 575° F. to 725° F.

2. A method according to claim 1 in which the pressure in excess of 350 p. s. i. g. is in the range from about 400 p. s. i. g. to 700 p. s. i. g.

3. A method according to claim 1 in which the temperature is between about 650° F. to 725° F.

4. In a method of synthesizing hydrocarbons by the interaction of carbon monoxide and hydrogen in the presence of an iron type catalyst in finely divided form maintained in a fluidized state under a pressure in excess of 350 p. s. i. g. and at a temperature between about 575° F. and 725° F., the preliminary step of contacting the catalyst in a highly active form with carbon monoxide and hydrogen at a pressure substantially above atmospheric but below about 350 p. s. i. g. and at a temperature below the aforesaid range for a period of time sufficient to effect the association with the iron type catalyst of carbon in an amount between about 30% and about 55% by weight of said catalyst.

5. In the process of synthesizing hydrocarbons by the interaction of carbon monoxide and hydrogen wherein a mixture of carbon monoxide and hydrogen is passed at an elevated operating pressure and at elevated temperatures over an iron type catalyst which has been subjected to a preliminary treatment with carbon monoxide under a pressure which is considerably lower than the operating pressure subsequently employed, the improvement which comprises starting said preliminary treatment with a highly active catalyst, maintaining said lower pressure within the approximate range of 200–300 lbs. per square inch for a period sufficient to modify the composition of said catalyst by the inclusion therein of an amount of carbon between 30% and about 55% by weight of said catalyst, maintaining said operating pressure within the approximate range of 400–800 lbs. per square inch and maintaining said temperature within the approximate range of 650°–750° F.

6. A method of synthesizing hydrocarbons by the interaction of carbon monoxide and hydrogen which comprises contacting carbon monoxide and hydrogen with a highly active, finely divided iron type synthesis catalyst maintained in a fluidized state at a pressure of about 200–300 lbs. per square inch and a temperature within the approximate range of 650° and 725° F., for a period sufficient to modify the composition of said catalyst by the inclusion therein of an amount of carbon between about 30% and about 55% by weight of said catalyst, thereafter raising the pressure to an operating level within the range of about 400 to 800 lbs. per square inch, and maintaining the pressure within said latter range for the remainder of the operation.

7. The method of claim 6 in which the volume of feed gas charged per hour per pound of catalyst is above 25 standard cu. ft.

8. The method of claim 7 in which said volume is at least 75–200 standard cu. ft.

JACK CALHOUN DART.
LLOYD B. SMITH.

REFERENCES CITED

The following references are of record in the file of this patent:

UNITED STATES PATENTS

| Number | Name | Date |
| --- | --- | --- |
| 2,224,048 | Herbert | Dec. 3, 1940 |
| 2,257,457 | Fischer et al. | Sept. 30, 1941 |
| 2,351,248 | Wirth | June 13, 1944 |
| 2,393,909 | Johnson | Jan. 29, 1946 |